…

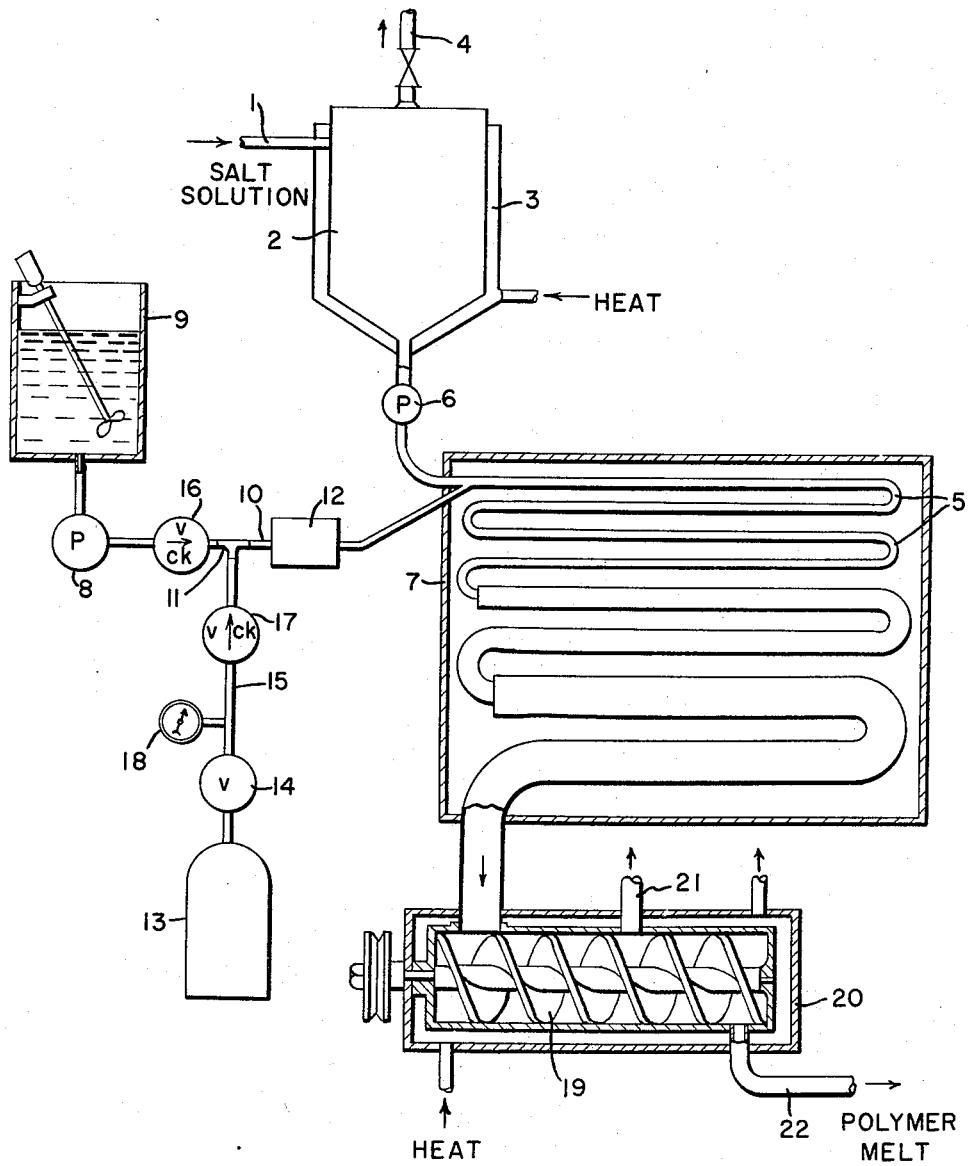

United States Patent Office 2,962,466
Patented Nov. 29, 1960

2,962,466

PROCESS OF INTRODUCING MODIFIER INTO A POLYMER MELT

John E. Parnell, Chattanooga, Tenn., assignor to E. I. du Pont de Nemours and Company, Wilmington, Del., a corporation of Delaware Filed Feb. 7, 1957, Ser. No. 638,834

6 Claims. (Cl. 260—37)

This invention relates to the continuous polymerization of polymer-forming compositions. Specifically it relates to a novel and improved means for injection of a liquid borne modifier into a polymer-forming composition during a continuous polymerization operation. More specifically, this invention relates to an improvement which increases the operability of a method of dispersing a delusterant in a polyamide, as disclosed by W. W. Heckert in United States Patent 2,689,839.

It is an object of this invention to provide an improved process for the continuous production of a delustered polyamide.

Another object is to provide an improved delusterant injection system for use during the production of a polyamide.

A further object is to provide a polyamide of uniform delusterant content.

These and other objects will become apparent in the course of the following specification and claims.

In accordance with the present invention a liquid borne modifier, intended for uniform dispersion in a stream of polymer melt, is mixed as it is being led to the stream of polymer melt, with an inert gas, the inert gas being at a pressure slightly above that at which the liquid borne modifier is fed to the stream of polymer melt. Mixing is conveniently accomplished with a mixing T between the pump that feeds the liquid borne modifier and the point at which the modifier is discharged into the stream of polymer melt.

Referring to the figure the polymerizable salt (for instance, aqueous solution of diamine-dicarboxylic acid salt) it introduced at line 1 into evaporator-reactor 2 where polymerization is initiated. Heat is supplied to reactor 2 by means of heating jacket 3. The steam produced during the polymerization process is removed through vent 4. The partially polymerized product is fed into flash tube 5 by means of polymer pump 6. Flash tube 5, which becomes progressively larger toward its outlet, is encased in heating jacket 7. The progressive enlargement of the flash tube permits the formation and removal of steam resulting during the polymerization reaction.

As will be apparent by reference to the figure the liquid borne modifying material is pumped into flash tube 5 by means of pump 8 which draws the liquid borne modifier (for instance, a water slurry of titanium dioxide delusterant) from mixing tank 9. The liquid borne modifier is then pumped through line 10 and is mixed with inert gas at mixing T 11, the mixture passing through preheater 12 and thereafter to flash tube 5. Inert gas is supplied by gas storage container 13 through pressure regulating valve 14 from which it is fed through line 15 to mixing T 11 previously identified. Check valves 16 and 17 prevent the back flow of liquid borne modifier and inert gas. Pressure indicator 18 is used for visual adjustment of gas feed. The mixture of the melted polymer and liquid borne modifier progresses through flash tube 5 and is discharged into screw conveyor 19.

The conveyor is heated by jacket 20. Steam formed in flash tube 5 is removed through steam exhaust vent 21. The finished polymer melt in which the modifier is now uniformly dispersed is removed from the apparatus through line 22.

In operation, the pressure regulating valve 14 is set to supply inert gas at a constant pressure, indicated on gauge 18, which may be about 10 pounds per square inch (p.s.i.) above that existing in line 10 at the inlet end of flash tube 5. More specifically, when polymerizing 66 nylon (polyhexamethylene adipamide), the pressure in line 10 will be about 250 p.s.i. (gauge) and valve 14 is set to deliver inert gas at a pressure of about 260 p.s.i. (gauge). Since this pressure is higher than that existing in line 10, there will be a small but steady flow of inert gas into the polyamide-forming system.

When an attempt is made to introduce the liquid borne modifier, as for instance an aqueous slurry of delusterant, into the stream of polymer melt without use of the inert gas as taught herein, pressure surges occur in the flash tube, which, in spite of check valves in the delusterant-introducing conduit (i.e. line 10), force polymeric material back into the conduit which furnishes the delusterant slurry. Similar difficulties may be caused by failure of delusterant check valve 16. When this occurs, the polyamide-forming composition freezes in the delusterant conduit, preventing further injection of the slurry. While the injection line is obstructed, the polymer and filament subsequently formed therefrom change in delusterant content causing non-uniformity in product. In addition, the modifier metering pump, in trying to force delusterant composition through the plugged line, labors under an excessive load causing frequent damage to bearings, pump-packing and driving motor.

Maintaining preheater 12 and line 10 at temperatures above the polymer melting point does not solve the problem, since, at the temperatures required to keep the polyamide composition fluid, the water in which the modifier (or delusterant) is dispersed is converted to steam, and deposits solidify within line 10. For this reason, in producing 66 nylon it is desirable to keep preheater 12 below a temperature of about 150° C. and to keep the modifier composition at preheater temperatures for as short a time as possible, in order to prevent agglomeration.

The following example is cited to illustrate the invention. It is not intended to limit it in any manner.

*Example*

A 47% solution of hexamethylenediamine adipic acid salt in water is introduced into an evaporator-reactor vessel (heated by Dowtherm A vapor, a commercial mixture of 26.5% diphenyl, 73.5% diphenyl oxide) through which it flows with heating and with steam removal at 250 pounds per square inch gauge pressure until the temperature reaches 235° C. Into the solution of partially-formed polyamide exiting from this vessel and containing about 14% water is pumped a 0.70% aqueous suspension of titanium dioxide preheated to 150° C., the time interval from heating to injecting being not greater than 30 seconds.

Regulating valve 14 is adjusted to deliver oxygen-free nitrogen from gas storage container 13 at a pressure of 260 p.s.i.g. Nitrogen gas enters the delusterant slurry feed at mixing T 11. Both streams pass through preheater 12 and enter the flash tube 5 via line 10.

These merging streams flow through the flash tube, which is heated with Dowtherm vapor at 285° C., where heat is supplied to furnish the latent heat of vaporization of water as it flashes off with reducing pressure during flow through the tube. At the same time the heat gradually increases the temperature of the effluent polymer to 280° C. at substantially atmospheric pressure. The two-phase mixture of steam-nitrogen and polyamide melt containing titanium dioxide is then passed into the screw conveyor, which is heated by Dowtherm vapor to 275° C., where the steam is released to the atmosphere. Polymer passes througth the screw conveyor finisher at atmospheric pressure over a period of about one hour, gradually losing water of reaction until the composition consists essentially of polyamide. The finished polymer as drawn off through pipe 22 has a relative viscosity of 46 and contains 0.02% titanium dioxide.

Continuous polymerization units, operated substantially as described above are observed to produce 66 nylon without plugging of the delusterant injection system (except for two instances caused by mechanical failure of auxiliary equipment) for a period of 45 machine months. This compares with 25 instances of plugging in 24 machine months prior to the installation of the gas delusterant injection system of this invention.

In general, as applied to the preparation of a delustered superpolyamide, the present invention may be considered an improvement over the process of United States Patent 2,689,839 to Heckert which process comprises continuously flowing a molten reaction mass of partially polymerized polyamide containing in the polymer chain recurring carbonamide groups, each attached directly to two carbon atoms in the polymer chain and at least 10% of water from a zone of high pressure (produced by polymer pump 6 and the restricted flow in the initial portion of flash tube 5), through a long heated passageway (flash tube 5) polymerizing the mass in the passageway by substantially uniformly and gradually reducing the pressure in the direction of flow to progressively flash the water into steam (accomplished by the gradual increase in diameter of flash tube 5 along the direction of flow) while supplying sufficient heat to maintain the temperature of the polymer above the melting point at all times and continuously introducing delusterant into the flowing mass during the polymerization while the temperature of the mass is from about 220° to 320° C. and the water content of the mass is in the range of from about 5 to 20% by weight. It is preferred in the Heckert process to introduce the delusterant as a 0.1 to 20% aqueous dispersion. The improved modification of the process of the present invention comprises the addition of the delusterant as a dispersion in admixture with an inert gas, the gas being maintained at a pressure slightly above that of the system to which the dispersion is added.

Any inert gas may be used in the process of the present invention which will not react with or degrade the polymer-forming composition. Nitrogen is quite suitable, as are the rare gases (helium, argon, neon, and the like). Other useful gases include carbon dioxide, carbon monoxide, and the like, as well as mixtures thereof.

The differential between the pressure of the gas stream supplied to mixing T 11 and the flash tube pressure is not critical. High differential pressures increase gas consumption and the amount of volatile component which must be subsequently separated from the polymer. Pressure differentials which are too small lead to insufficient gas flow to maintain continuity of operation. In general, when manufacturing 66 nylon, a pressure differential of 5 to 20 p.s.i.g. is satisfactory. A differential of at least 10 p.s.i. is preferred.

It is apparent that the pressure level at which the process of this invention operates is not limiting. Thus, pressures in polyamidation flash tubes may run from atmospheric or below to 500 p.s.i. or more. Whenever process conditions are such that pressure surges force solidifiable material back into a side-stream injection apparatus, the process of this invention may advantageously be employed. Such conditions may exist in continuous polymerization processes at subatmospheric pressures.

Any conventional modifier, such as a delusterant, inorganic or organic, may be added according to the process of this invention. Suitable delusterants are mentioned by Graves in United States Patent 2,205,722. Preferably such delusterants are suspended in water, but other inert liquids may be used in conveying them. Other modifiers which may be injected by the process of the present invention include pigments, fillers, stabilizers, color inhibitors, dyes and the like.

While the process of this invention has been described in terms of the continuous production of hexamethylene adipamide, it is equally useful in the production of other polymers such as polycaproamide and those polyamides and copolyamides described by Carothers in United States Patents 2,071,250; 2,071,253; 2,130,948, and 2,190,770 and condensation polymers generally including polyesters, polyethers, polyanhydrides, polyacetals, polyureas, polyurethanes and the like. Formation of such polymers is described in United States Patents 2,071,251; 2,071,252; 2,465,319, in addition to those already cited.

Many obvious modifications will be apparent to those skilled in the art from a reading of the above without a departure from the inventive concept.

What is claimed is:

1. A process for introducing a liquid borne modifier uniformly into a stream of polymer melt which comprises mixing the said liquid borne modifier as it is being led to the stream of polymer melt with an inert gas, the said gas being maintained at a pressure at least about 5 p.s.i.g. above that at which the liquid borne modifier enters the said stream of polymer melt.

2. The process of claim 1 wherein the modifier is a delusterant.

3. The process of claim 1 wherein the modifier is titanium dioxide.

4. The process of claim 1 wherein the polymer is polyhexamethylene adipamide.

5. A process for introducing an aqueous suspension of titanium dioxide uniformly into a stream of polymer-melt which comprises mixing the said titanium dioxide suspension as it is being led to the stream of polymer-melt with an inert gas, the said gas being maintained at a pressure at least about 5 p.s.i.g. above that at which the titanium dioxide suspension enters the said stream of polymer-melt.

6. The process of claim 5 wherein the polymer is polyhexamethylene adipamide and the inert gas is maintained at a pressure between 5 to 20 p.s.i.g. above that at which the aqueous suspension of titanium dioxide enters the polymer-melt stream.

References Cited in the file of this patent

UNITED STATES PATENTS

| | | |
|---|---|---|
| 2,064,708 | Wilson | Dec. 15, 1936 |
| 2,689,839 | Heckert | Sept. 21, 1954 |
| 2,773,047 | Pirot et al. | Dec. 4, 1956 |